No. 832,385. PATENTED OCT. 2, 1906.
G. L. HOLLINGSWORTH.
CAR STOP.
APPLICATION FILED MAY 31, 1906.
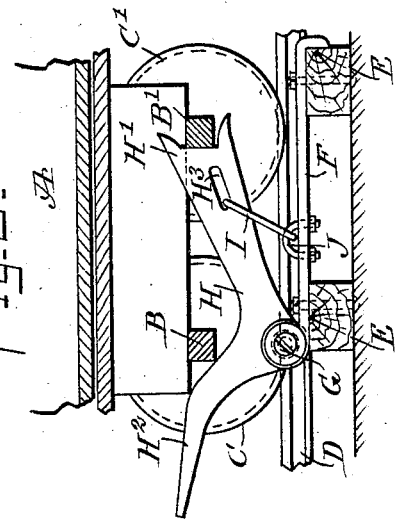
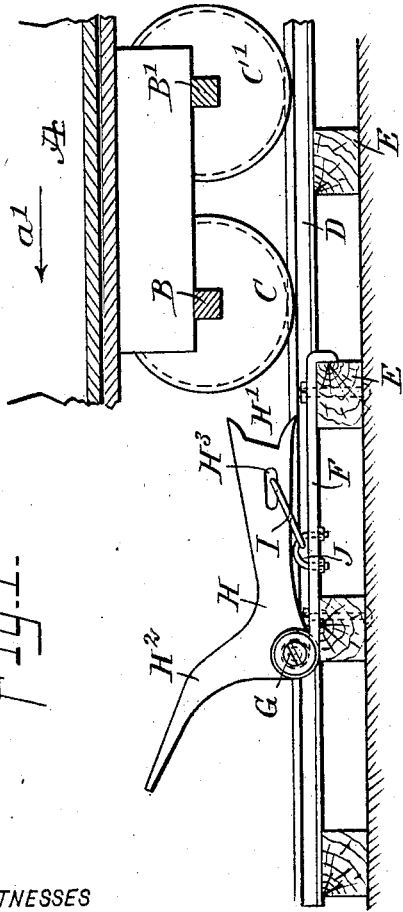
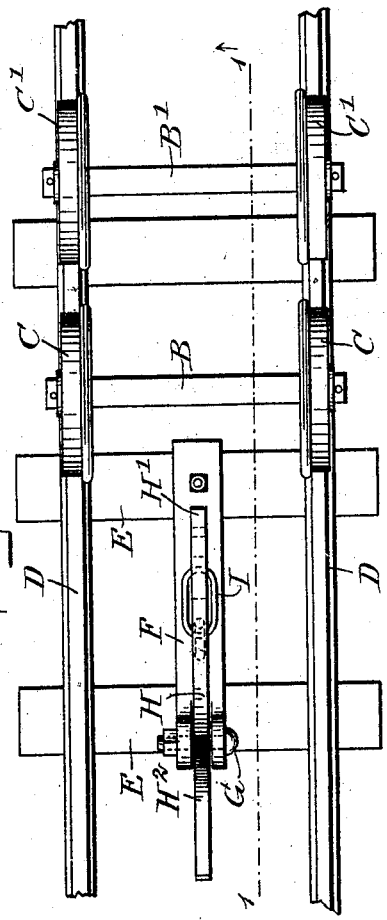
WITNESSES
INVENTOR
George L. Hollingsworth
BY
ATTORNEYS

UNITED STATES PATENT OFFICE.

GEORGE L. HOLLINGSWORTH, OF SILVERTON, COLORADO.

CAR-STOP.

No. 832,385.     Specification of Letters Patent.     Patented Oct. 2, 1906.

Application filed May 31, 1906. Serial No. 319,512.

*To all whom it may concern:*

Be it known that I, GEORGE L. HOLLINGSWORTH, a citizen of the United States, and a resident of Silverton, in the county of San Juan and State of Colorado, have invented a new and Improved Car-Stop, of which the following is a full, clear, and exact description.

The object of the invention is to provide a new and improved car-stop more especially designed for use on mining-railroads and the like and arranged to automatically stop a dumping-car when the latter reaches the place of dumping.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied, the car and track being shown in section on the line 1 1 of Fig. 2. Fig. 2 is a plan view of the same, and Fig. 3 is a side elevation of the improvement in stopping position.

The dumping-car A, of any approved construction, is provided with the usual front and rear axles B B', on which are mounted the front and rear car-wheels C C', traveling on the track-rails D, attached to the ties E of the railroad-bed. On the adjacent ties E at the place of dumping the car A is secured a plate F, carrying a transverse pivot G, on which is mounted to swing a lever H, having its forward end provided with a fork H', adapted to engage the rear axle B', as plainly shown in Fig. 3, and the rear end H² of the said lever H is curved upwardly and rearwardly and is adapted to be engaged by the front axle B, so that when the car A travels in the direction of the arrow a' and the lever H is in the normal dormant position (shown in Fig. 1) then the front axle B passes over the front fork H' of the lever, but engages the rear curved end H², thereby imparting an upward swinging motion to the front end of the lever H to bring the fork H' in position for receiving the rear axle B'. When this takes place, the forward movement of the car is stopped, and the power is thus held at the place of dumping to permit of dumping or otherwise unloading the car.

In order to limit the upward swinging motion of the forward end of the lever H, a link I is provided, held on a staple J, attached to the plate F and engaging an elongated slot H³ in the forward end of the lever H. The link I is so proportioned as to limit the upward swinging motion of the lever H, so that the rear axle B' properly engages the fork H' of the lever H, as plainly indicated in Fig. 3.

From the foregoing it will be seen that the front axle B not only imparts a swinging motion to the lever H for bringing the fork H' into position to receive the rear axle B', but the said front axle B holds the lever H in this active position until the car A is run back on the track-rails D—that is, in the inverse direction of the arrow a'. When this takes place, the lever H swings back to its normal position, as shown in Fig. 1, so as to be again in position for stopping the next car when it comes to the place of dumping.

The device is very simple and durable in construction and can be cheaply manufactured and readily placed in position on the desired point of the track.

Having thus described my invention, I claim as new and desire to secure by Letters Patent—

1. The combination with a railroad-track and a car thereon, of a lever fulcrumed between the track-rails and extending lengthwise of the track, the front end of the lever being adapted to be engaged by the rear axle of the car, and the rear end of the lever being curved upwardly and rearwardly, to be engaged by the front axle of the car to swing the lever into stopping position and hold it therein.

2. A car-stop provided with a lever having one end adapted to be engaged by the front axle of the car and its other end provided with a fork adapted to receive the rear axle, to hold the car against forward movement.

3. A car-stop provided with a lever arranged lengthwise in the path of the car, the lever having its rear end curved upwardly and rearwardly to be engaged by the front axle of the car, and the said lever having its forward end provided with a fork adapted to engage the rear axle of the car to hold the latter against forward movement.

4. A car-stop provided with a lever arranged lengthwise in the path of the car, the lever having its rear end curved upwardly and rearwardly to be engaged by the front axle of the car, the said lever having its forward end provided with a fork adapted to engage the rear axle of the car to hold the latter against forward movement, and means to limit the swinging movement of the said lever.

5. A car-stop, comprising a plate for attachment to the ties between the track-rails, a lever fulcrumed on the said plate and extending lengthwise of the track, the forward end of the lever being forked and the rear end being curved upwardly and rearwardly and adapted to be engaged by the front axle of the car, to swing the forked end of the lever into position for engagement by the rear axle.

6. A car-stop, comprising a plate for attachment to the ties between the track-rails, a lever fulcrumed on the said plate and extending lengthwise of the track, the forward end of the lever being forked and the rear end being curved upwardly and rearwardly and adapted to be engaged by the front axle of the car, to swing the forked end of the lever into position for engagement by the rear axle, and a link held on the said plate and engaging an elongated slot in the said lever, to limit the swinging motion thereof.

In testimony whereof I have signed my name to this specification in the presence of two subscribing witnesses.

GEORGE L. HOLLINGSWORTH.

Witnesses:
 RALPH PLANTZ,
 E. V. HOLLINGSWORTH.